No. 770,809. Patented September 27, 1904.

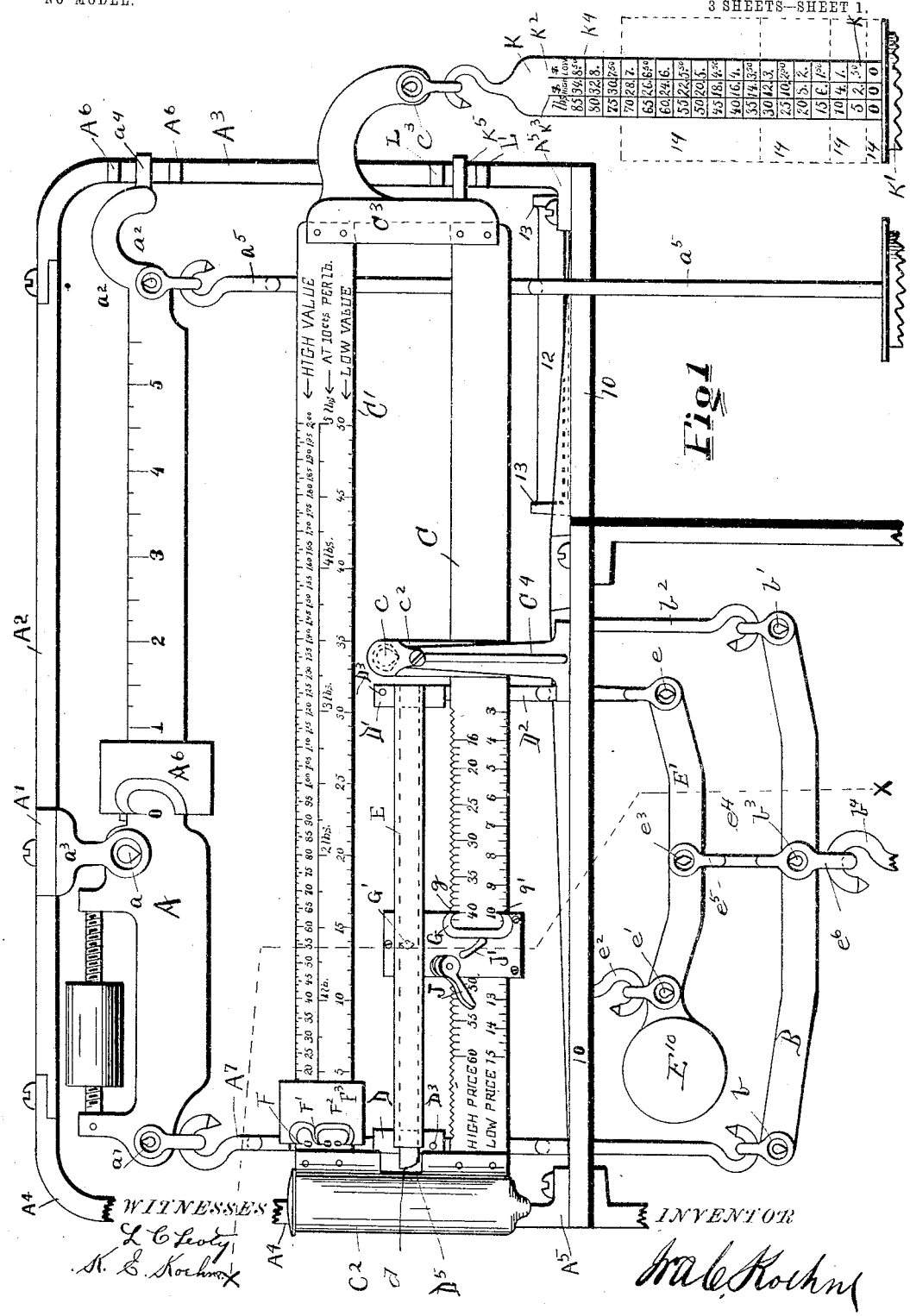

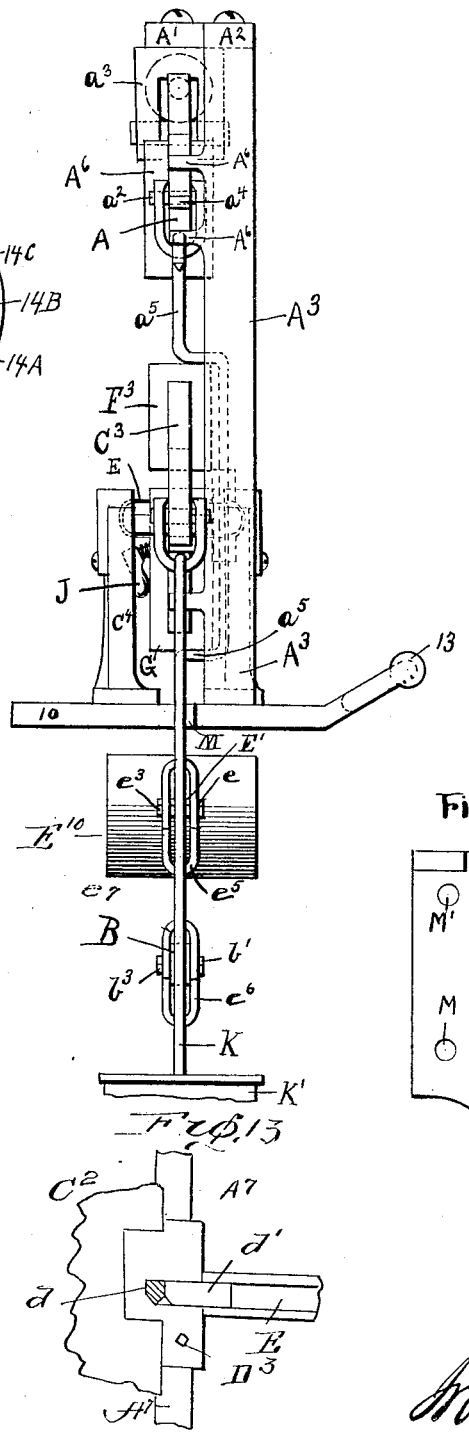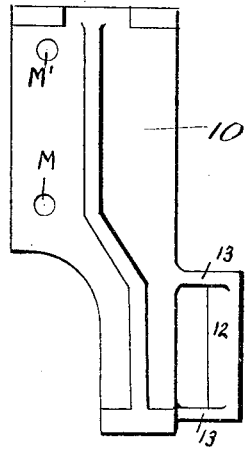

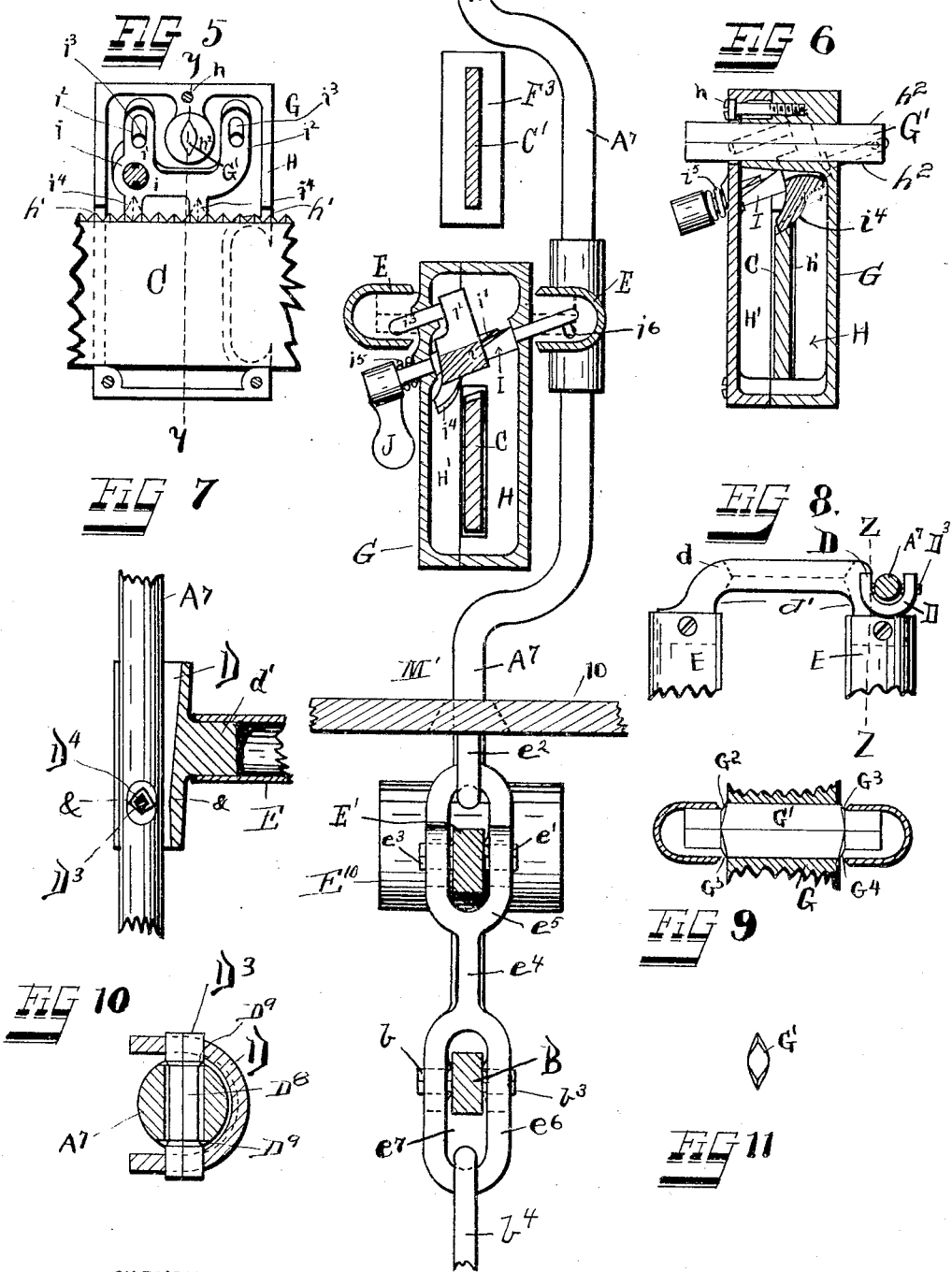

UNITED STATES PATENT OFFICE.

IRA C. KOEHNE, OF COLUMBUS, OHIO, ASSIGNOR, BY MESNE ASSIGNMENTS, TO THE COMPUTING SCALE COMPANY, A CORPORATION OF OHIO.

PRICE-INDICATING SCALE.

SPECIFICATION forming part of Letters Patent No. 770,809, dated September 27, 1904.

Application filed December 1, 1896. Renewed May 23, 1903. Serial No. 158,544. (No model.)

*To all whom it may concern:*

Be it known that I, IRA C. KOEHNE, a citizen of the United States, residing at Columbus, in the county of Franklin, State of Ohio, have invented a new and useful Improvement in Price-Indicating Scales; and I do hereby declare that the following is a full, clear, and exact description of the invention, which will enable others skilled in the art to which it appertains to make and use the same when this exclusive grant shall have expired.

This invention relates primarily to that class of price-indicating scales wherein a movable fulcrum is employed to effect the operation of the price-indicating beam or indicator, which displays the value of the article counterbalanced, and it more particularly relates to that class wherein the moving of the price-per-pound poise varies the fulcrum of the price-indicating beam or indicator proportionate to the rate or price per pound.

The present invention has for its object the improvement of the construction and operation of weighing and price-indicating scales whereby they are rendered more simple of construction, effective in operation, and less liable to become inoperative or inaccurate through rough handling or adroit manipulation.

To this end the improvement consists in and anticipates the employment of a pathway or track carried, preferably in this instance, in line with the knife-edge pivots of the price-indicating beam and with which the knife-edged pivot of the price-per-pound poise engages in the operation of price indicating, as well as means for freeing the knife-edges of the rate-pivot of the rate or price per pound poise from said pathway or track only when said poise is being moved to vary the fulcrum of the price-indicating beam or indicator proportionate to the rate or price per pound.

It further consists in and anticipates the employment of a variable-fulcrum mechanism carried by the free ends of a series of levers pivotally connected together and supported independent of each other, whereby there is no binding in nor side draft upon the pivots of said levers caused when said rate pivot or fulcrum is varied to either of its extreme points.

It further consists in and anticipates the employment of a weighing or tare beam and a variable-fulcrum mechanism for the price-indicating beam or indicator, said tare-beam and one end of said variable-fulcrum mechanism being connected to a pivotally-supported lever and the other end of said variable-fulcrum mechanism being connected to a second pivotally-supported lever, which levers are pivotally connected together, at which pivotal point the weight-receiving member is connected.

It further consists in and anticipates the employment of a series of removable counterbalance-capacity-increasing members or weights coöperating with a series of money and weight value capacity-increasing characters or money-value-capacity increasing characters alone in such manner that said characters are automatically exposed to indicate the full money and weight value (or money value alone) of a load proportionate to the counterbalancing effect exerted by said members or weights at given rates or prices per pound.

It furthermore consists in novel structures and new combinations and arrangement of the parts, all as will be hereinafter described, and particularly referred to in the annexed claims, reference being had to the accompanying drawings, forming a part of this specification.

Heretofore it has been common in this art to vary the leverage of the scale by changing the length of the load-arm of the price-beam proportionate to the rate or price per unit by moving the price-indicating beam, as in Patent No. 6,194 or No. 114,248 or in the several Pitrat patents, while it has also been common to accomplish this same general result by varying the position of the rate or price per pound indicating connection of poise by moving it upon the price-indicating beam, as in Patent No. 80,003, which is believed to be the pioneer in this particular class. Therefore, bearing in mind this exposition of the prior art, it must be remembered that the present application does not involve any new principle in price-indicating scales, considered broadly, and that this invention consists in certain new constructions, combinations, and arrangements of the parts considered more or less broadly in proportion as they are new in the art.

Referring to the drawings, Figure 1 is a front elevation of one form of scale embodying my invention, as much of the framework being shown as is necessary to show the arrangements of the parts and the manner of their connection. Fig. 2 is a side elevation of the same, showing principally the framework and the arrangement of the weighing and price-indicating beams. Fig. 3 is a reduced plan view of the base-plate 10. Fig. 4 is an enlarged sectional view on line X X of Fig. 1. Fig. 5 is a front elevation of the rate or price per pound indicating poise with its face-plate removed to show parts beneath. Fig. 6 is a sectional view of the whole rate or price indicating poise on line Y Y of Fig. 5. Fig. 7 is an enlarged sectional view on line Z Z of Fig. 8. Fig. 8 is an enlarged plan view of a portion of the steelyard-rod connection, illustrating the manner of connecting it with the tracks. Fig. 9 is a sectional view of the rate or price indicating poise, showing its knife-edged rate-pivot in side elevation and the manner in which it engages with the tracks, said figure illustrating in conjunction with Fig. 11 the preferred formation of the knife-edged pivot for said poise. Fig. 10 is an enlarged plan view on line & & of Fig. 7. Fig. 11 is a front elevation of a preferred form of knife-edged rate-pivot for the rate or price indicating poise. Fig. 12 is a plan view of one of the weights 14, showing the bar K in section; and Fig. 13 is a side elevation view of a portion of the rear end of the price-beam, showing the front track E and its support broken away close to the front side of the price-beam.

A represents a weighing or tare beam of the usual form and construction, having fulcrum-pivot $a$, load-pivot $a'$, and counterpoise-pivot $a^2$. The fulcrum-pivot $a$ is supported in a yoke $a^3$, attached to a projection A' of a frame-piece A², supported upon standards A³ and A⁴, secured to a base-plate 10 by integral feet A⁵ in any well-known and desirable manner. The beam A is graduated in any well-known manner and is provided with a poise A⁶ to indicate said graduations, while the outer end of said beam is provided with a projection $a^4$, resting in a slot formed by two integral projections A⁶, extending at right angles from the standard A³ for the purpose of confining and indicating the movement or action of said beam.

The load-pivot $a'$ is provided with the usual loop, into which is hooked the steelyard-rod connection A⁷, the lower end of which rod connection is hooked into a loop engaging with knife-edge $b$, seated in the free outer end of lever B, whose fucrum-pivot $b'$ rests in a loop hooked into rod $b^2$, secured to the under side of base-plate 10. The load-pivot $b^3$ of lever B, which in this instance is intermediate the ends of said lever B, supports a loop into which is hooked rod $b^4$. This rod $b^4$ connects the scale-beams and levers with the weight-receiving pan or platform, (not shown in this instance, but of usual or desirable construction,) and said rod $b^4$ is in this instance described as the weight or load receiver. This connection can be accomplished by attaching the weight-receiving pan or platform directly to the rod $b^4$, or said pan or platform may be connected to this rod by a system of one or more intermediate fulcrumed levers, the choice being governed principally by the purposes for which the scale will be used.

The price-indicating beam is formed in this instance of parallel bars C and C', connected at their respective ends by castings C² and C³, Fig. 1, while said price-indicating beam is carried by fulcrum-pivot $c$, resting in suitable seats in the tops of the arms of the U-shaped beam-standard C⁴, suitably secured to the base-plate 10. This fulcrum-pivot $c$ is rigidly mounted in a projection $c^2$, extending vertically from the bar C of the price-indicating beam. The counterpoise-pivot $c^3$ of the price-indicating beam is rigidly mounted in a projection of the casting C³, said pivot carrying the usual loop, into which is hooked the counterpoise-weight-receiving member, the construction of which will be hereinafter more particularly described.

The weighing or tare beam A and the price-indicating beam are mounted the one directly above the other in vertical alinement, (see Figs. 1 and 2,) while the lever B is located directly below the price-indicating beam and in vertical alinement therewith and with the weighing or tare beam. (See Figs. 1 and 4.) In addition to this vertical arrangement of the beams and lever the price-indicating beam is extended considerably to the left, (see Fig. 1,) and I laterally deflect the steelyard-rod connection A⁷ intermediate its ends to prevent its contacting with said price-indicating beam, as seen in Figs. 1 and 4, and the counterpoise-rod $a^5$, hooked into the loop carried by pivot $a^2$ of the weighing-beam, I likewise laterally deflect intermediate its ends to avoid contact with the price-indicating-beam, all for the purpose of bringing the tare and price beams and counterpoise-weight receivers $a^5$ and K adjacent each other in the same vertical plane, so that the indicating graduations on said beams and the readings of the counterpoise-weights on their receivers may be readily seen and read at a single glance, owing to the proximity of said parts; furthermore, to bring said receivers $a^5$ and K below the lowest beam, with the disks on their lower ends the same relative height, and also to bring the point of application of load to rod A⁷ and the point of connection of rod A⁷ with the loop of load-pivot $a'$ of beam A in the same vertical plane with the tare and price beams, so that connections may be made with said beams in substantially the same vertical plane and lateral strain or deflection prevented.

To the steelyard-rod connection $A^7$ is pivoted a casting D, Figs. 1, 7, 8, and 10, provided with arm $d$, projecting at right angles from the direction of said steelyard-rod, and also with projections $d'$, to which are attached U-shaped tracks or pathways E, arranged a slight distance apart and facing each other. (See Figs. 8 and 9.) This casting D is mounted upon the steelyard-rod connection $A^7$ at such a height in this instance that the upper internal faces of these pathways or tracks E are in line with the knife-edges of the pivots $c$ and $c^3$ and the upper knife-edges of the rate-pivot $G'$ of the price-indicating beam, (see Fig. 1,) said knife-edges of said pivots being arranged upon a straight line passing substantially through the longitudinal center of said beam, so that the weight of said beam distributed above and below said line of said knife-edges will be equal in order that the scale will have the proper degree of sensitiveness and stability of balance when said edges of said tracks E directly engage with the upper knife-edges of the rate-pivot $G'$ in the operation of pricing and at the same time to afford means for securing an indifferent equilibrium of the applied forces. The opposite ends of these tracks or pathways E are secured in any desirable manner to a casting $D'$, pivoted to the upper end of a rod $D^2$, whose lower end is pivoted in this instance with an integral loop engaging in this instance with a diamond-shaped pivot $e$, rigid in the outer free end of lever $E'$. This rod $D^2$ is bent to one side of the price-indicating beam, with its lower portion vertically below said price-beam in a manner similar to the steelyard-rod connection $A^7$. The lever $E'$ is provided with a fulcrum-pivot $e'$, in this instance near one of its ends and engaging in a loop held in position by a hook $e^2$, projecting from the under side of base-plate 10. The rod $D^2$ and the rod connection $A^7$ pass through openings M and $M'$, respectively, in the base-plate 10, as shown in Fig. 3 and in dotted lines in Fig. 4, for the purpose of enabling said base-plate 10 to cover as much as possible the parts beneath said plate 10 and protect said parts from vertically-falling particles and dust. The load-pivot $b^3$ of lever B and the load-pivot $e^3$ of lever $E'$ are in this instance vertically one above the other and are connected together by a connection $e^4$, (see Figs. 1 and 4,) said connection being provided on its upper end with a bifurcated part $e^5$, forming the loop connection for receiving the diamond-shaped pivot $e^3$. The part $e^4$ is rigidly connected at its lower end with an elliptical-shaped part $e^6$, having an opening $e^7$, through which the lever B passes, which part $e^6$ also forms the loop connection for receiving the pivot $b^3$.

The parallel bar $C'$, forming part of the price-indicating beam, is graduated in this instance on its upper side in money values from naught to two dollars, as shown, while through the center this bar is provided in this instance with pound and ounce graduations from naught to five pounds, which graduations are to be read only when the price-poise is set at "10," as hereinafter explained. The lower side of this bar $C'$ is provided with graduations in money value from naught to fifty cents, as shown. These respective graduations are indicated, respectively, by indicating projections F, $F'$, and $F^2$ of a poise $F^3$, moving on said bar $C'$, Fig. 1. The bar C of the price-indicating beam is graduated and provided with a series of characters extending to the left of the beam-fulcrum and indicating rates or prices per pound, increasing toward the left. This bar C is notched on its upper side, as hereinafter described, and the rate or price per pound graduations are in two series, one high and one low, to correspond with the high and low money-value graduations, respectively, upon the upper and lower edges of the bar C of the price-beam.

G represents the rate or price per pound indicating poise adapted to slide upon the left-hand end of the bar C and to indicate the high and low rates or graduations, respectively, upon the upper and lower edges of said bar C by indicating projections $g$ and $g'$, respectively. Above the bar C the price-poise G is provided in this instance with a knife-edged diamond-shaped rate-pivot $G'$, whose upper and lower edges alone are knife-edges. This pivot $G'$ is mounted in this instance within and adapted to engage the U-shaped tracks or pathways E. (See Figs. 1, 4, and 9.) The rate-indicating poise G is provided with suitable operating means or a handle which actuates a dog engaging with the notches on bar C and releases said rate-indicating poise from its engagement with the bar C whenever said operating means or handle are moved for the purpose of changing the rate or price per pound. Since the rate-indicating poise G carries the rate-pivot $G'$ and is moved on the bar C and locked thereto at greater or less distances from the fulcrum $c$ of the price-indicating beam, while the U-shaped tracks E, engaging with the rate-pivot $G'$, have a constant unvarying leverage from one end of said tracks E to the other, it will be seen that this movement of the rate or price poise to change the rate indicating per pound varies only the leverage of the price-indicating beam upon the weight suspended from the rod $b^4$, which for convenience is termed the "load" or "weight" receiver. Furthermore, it will be readily observed that this means of connecting the weighing-levers of the scale with the price-indicating beam may be modified to some extent without changing the spirit or principle of my invention. For instance, the tracks E may be carried below the bar C of the price-indicating beam and connected with the knife-edged rate-pivot G' by a sliding connection movable with the rate-pivot G' without departing from the spirit and scope of my invention.

The rate-indicating poise G is formed in this instance of a hollow shell H and a recessed face-plate H', Fig. 6, secured together by screws $h$, Figs. 5 and 6. The knife-edged rate-pivot G', Figs. 5 and 6, is rigidly mounted in this instance in a boss $h^2$, integral with the shell H and extending within the recess of the plate H', while the opening in plate H', through which said pivot passes, is slightly larger than the size of said pivot G', which construction permits the plate H' to be secured to and removed from the shell H without disturbing or straining the pivot G', secured only in boss $h^2$ of shell H. The shell H, Figs. 5 and 6, is provided in this instance with a recess $h'$ to permit the passage of bar C therethrough, said recess being slightly deeper and wider than said bar C in order to permit the free movement of said poise G, composed of the attached shells H and H', on bar C.

On the left-hand side of poise G in the instance shown and above the bar C a spirally-threaded shaft I extends in this instance at a slight angle. The respective ends of this shaft I are in this instance reduced in diameter to form shouldered bearings in the respective plates H and H', forming said poise G. Mounted freely upon the threaded portion of shaft I is in this instance a forging $i$, provided with projections engaging in this instance the spiral grooves $i'$, Figs. 4 and 5, formed in shaft I for the purpose of causing said forging $i$ to be moved forward and backward accordingly as shaft I is revolved in one direction or the other. This forging $i$ is provided in this instance with upwardly-extending arms $i^2$, arranged to extend on opposite sides of the boss $h^2$. In the upper ends of these arms $i^2$ are in this instance secured the pins $i^3$, moving in openings formed in the face-plate H' of poise G. (See Figs. 4 and 5.) These pins $i^3$ are in this instance shown arranged parallel to the shaft I, and the ends of said pins $i^3$, sliding in the openings in plate H², are adapted to prevent the turning of forging $i$ with shaft I, while the extreme outer ends of said pins $i^3$ are adapted in their abnormal or extended position (shown in Fig. 4) to project slightly below the lower knife-edge of pivot G' and prevent knife-edge of pivot G' from scraping against the track E when poise G is unlocked from bar C of the price-beam and is being moved to change the rate or price per pound, as will be hereinafter more fully explained. The forging $i$ is provided on its under side with beveled or substantially V-shaped projections $i^4$, arranged in this instance at a slight angle to shaft I or adapted to readily engage in and fit the substantially V-shaped or beveled notches on the upper side of bar C. (See Figs. 4, 5, and 6.) The notches in bar C are in this instance cut at an angle substantially parallel with shaft I, and said notches are also tapered in this instance from the front to the back, (see Fig. 5,) which forms a notch whose crown forms a sharp line sloping upward from the root-line of said teeth or notches. With this formation of notch and the sloping faces of the V-shaped projections $i^4$ it will be readily seen that when forging $i$ is shifted to the right in Fig. 4 by the rotation of its shaft I the notches in the bar C will be firmly engaged by the projections $i^4$ and the poise G thus firmly locked to the bar C, while in this instance a spring $i^5$ on the forward end of shaft I and having its ends secured, respectively, to the face-plate H', and a handle or thumb-piece J, rigidly attached to the extreme outer end of this shaft I, causes said shaft I to rotate, as aforesaid, to move forging $i$ from the position shown in Fig. 4 to that shown in Fig. 6 and keeps the poise G firmly locked to bar C. On the extreme rear or right-hand end of shaft I (see Fig. 4) is secured in this instance a pin $i^6$, which is adapted to project almost vertically downward when the forging $i$ and the thumb-piece J are in the unlocked position of the poise G, (shown in Fig. 4,) in which position the extreme lower end of said pin $i^6$ projects slightly below the lower knife-edge of rate-pivot G', (see Fig. 4,) and thus prevents said lower knife-edge of pivot G' from scraping on track E when poise G is unlocked from bar C' and is being moved. As will be seen in Fig. 4, said pins $i^3$ are at their lowest position when said pin $i^6$ points vertically downward and that the extreme ends of said pins $i^3$ and $i^6$ in said lowest position project slightly below the lower knife-edge of pivot G' and that both sets of pins $i^3$ and the pin $i^6$ coöperate to contact with the lower inner edge of tracks E to prevent said lower knife-edge of pivot G' from scraping the tracks E when the poise is unlocked and being moved, and at the same time said pins or projections $i^3$ and $i^6$ form in the instance shown the means for breaking the pivotal connection between the rate-indicating poise and the horizontal part and non-pivotally connecting them on opposite sides of the pivotal connection between the rate-poise and said horizontal part, and which pivotal connection supports said rate-indicating horizontal part and out of poise upon said horizontal part and out of poise upon said substantially V-shaped engagement with the notches in the upper edge rate-representing notches in the upper edge of bar C of the price-beam, so that said poise will not rest upon said bar C or catch in the notches on the upper edge thereof when moved to change the rate per unit, and, furthermore, that when poise G is locked to bar C the extreme ends of pins $i^3$ and $i^6$ are at their positions farthest from said lower inner edge of tracks E, (see dotted lines in Fig. 6,) and that the free and uninterrupted action of the respective knife-edges of pivot G' upon the inner edges of the tracks E, as well as the firm engagement of the rate-poise G with the notched bar C of the price-beam, are permitted. It will thus be seen that manually-operated means are provided in this instance for simultaneously holding the rate-poise and its locking projections out of engagement with the rate-representing notches on the price-beam, as well as to form a non-pivotal connection between the horizontal part or tracks and the rate-poise to support said poise upon said part or tracks during the adjustment of said rate-poise in changing the rate per unit, and that said non-pivotal connection in this instance performs the additional function of holding the rate-pivot out of engagement with said horizontal part or tracks during said changing of the rate per pound. It will, furthermore, be seen that in the operation of indicating the price of articles at different rates per unit the strain is downward upon the rate-indicating poise G and that said downward pressure is imparted to the price-indicating beam through the V-shaped projections $i^4$ near opposite sides of the poise engaging between the notches formed upon the upper edge of the bar C of the price-beam, and therefore that the position of the rate-poise G will be very accurate and cannot be altered in operation. It is of prime importance to accurately locate and maintain the position of the rate-indicating poise for each rate, so that the rate-pivot G', carried by said poise, will occupy a definite position from the fulcrum-pivot $c$ of the price-beam for each different rate per unit, so that the load whose price is to be indicated will be transmitted from the horizontal part or tracks E to the rate-pivot G' when said pivot G' is accurately located the requisite distance from the fulcrum-pivot $c$ of the price-beam to represent the indicated rate per unit. It will thus be seen when the load transmitted to the horizontal part or tracks E is transmitted to the price-beam by the beveled or V-shaped projections of the poise engaging between the notches formed upon the upper edge of bar C of the price-beam that said load will firmly seat said projections of the poise in their correspondingly-beveled seats between the notches upon the bar of the price-beam, and that by so doing the load insures the accurate positioning of the rate-indicating poise and its pivot G', so that the price at any given rate will be very accurately indicated.

In the preferred form (shown in Figs. 9 and 11) the ends of pivot G' are of slightly-decreased vertical diameter, thus forming V-shaped shoulders $G^2$, $G^3$, $G^4$, and $G^5$, which, in conjunction with the beveled edges of the tracks E, form knife-edged lateral bearings between tracks E and pivot G', which reduces the friction of any side draft or lateral displacement of tracks E or poise G.

The castings D and D' are, as has heretofore been described, pivoted to rods $A^7$ and $D^2$, respectively. Both pivotal connections are in this instance formed by an angular or preferably square pivot $D^3$, rigidly secured to casings D and D' and having free bearings in this instance in substantially octagonal-shaped openings $D^4$, Figs. 7, 10, and 13, formed, respectively, in rods $A^7$ and $D^2$. That part of the pivots $D^3$ which bears in openings $D^4$ is formed in this instance of slightly-reduced diameter $D^8$, which tapers slightly at each end up to the full diameter of said pivots, as shown in Fig. 10, which tapering edges form a series of knife-edged friction-points $D^9$, with which the lateral edges of openings $D^4$ are adapted to contact to decrease the friction of any lateral displacement of castings D D' or rods $A^7$ $D^2$, said friction-points being for the same purpose as the friction-points $G^2$, $G^3$, $G^4$, and $G^5$ of pivot G' heretofore described. Said pivots $D^3$, although preferably formed diamond shape and working in a diamond-shape opening $D^4$, as shown in Fig. 7, may be formed of any desired shape—for instance, substantially circular, as in Fig. 1. It will be observed that in this instance in the casting D the pivot $D^3$ is below the tracks E, while in casting D' the pivot $D^3$ is located above the tracks E. This arrangement of pivots $D^3$, together with the fact that the castings D and D' are loose upon their respective rods $A^7$ and $D^2$, (see Figs. 7 and 10,) is for the special purpose of permitting any slight endwise movement of the tracks E due to the varying arcs produced by the different distances at which rate-pivot G' is adapted to be from fulcrum C of the price-beam by the shifting of the poise G to its various positions upon the bar C of the price-indicating beam. The lower edge of arm $d$ of casting D is in this instance V-shaped, Figs. 1 and 13, and engages in the bottom of a slot $D^5$, formed in casting $C^2$ for the purpose of preventing undue friction between the bottoms of pins $i^3$ and $i^5$, and the horizontal part or tracks E, and thus prevent the rate-poise from engaging with the notches in the price-beam when the rate is being changed at a time when a number of counterpoise-weights are suspended from the counterpoise-pivot $c^3$ of the price-indicating beam.

The extreme left-hand end of lever E' (see Figs. 1 and 4) is provided with a counter-weighted end $E^{10}$ in this instance, its function being merely to keep the knife-edge $e'$ always seated in its loop and obviate the necessity of said pivot being formed diamond-shaped. The pivots $e$ and $e^3$ of said lever E must in this instance be formed diamond-shaped, for the reason that the tracks E normally carry the weight of poise G, in which case the upper edge of pivot $e$ is bearing against its loop while the lower edge of pivot $e^3$ is bearing against its loop, since the counterweighted end of lever $E'$ is not sufficiently heavy to carry the weight of poise G when at some of the lower rates or prices per pound.

K in Fig. 1 represents in this instance the counterpoise-rod suspended from the counterpoise-pivot $c^3$ of the price-indicating beam by the loop shown. This counterpoise-rod is formed in this instance flat, and is provided on opposite sides with a series of rows of characters or numbers indicating decreasing values from near the pivot $c^3$ down to the disk $K'$, secured to the bottom of said rod K, at which point said values represent nothing. The characters in the instance shown are arranged in three separate rows. The first indicate weights in sums advancing by increments of the highest weight indication shown on bar C of the price-beam, in this instance five-pound increments. The second vertical row indicates dollars at the higher rates or prices per pound in sums advancing by increments of the highest value indication shown in the row of high values indicated on bar C of the price-beam, in this instance two-dollar increments, while the last vertical row of characters indicate dollars and cents at the lower prices per pound and advancing by increments of the highest value indication shown in the row of low values indicated on bar C of the price-beam, in this instance fifty-cent increments. These separate rows of characters are in this instance, for the sake of clearness, separated vertically by vertical lines $K^2$ and $K^3$, Fig. 1, while the separate numbers in each column are separated by horizontal lines $K^4$, as shown. The counterpoise-weights used in this instance are of uniform height proportionate to their counterbalancing forces and are shown in dotted lines in Fig. 1, the lower dotted weight representing in this instance five pounds, or a high value of two dollars or a low value of fifty cents, the second dotted weight representing in this instance ten pounds, or a high value of four dollars or a low value of one dollar, the third dotted weight representing in this instance a value of twenty pounds, or a high value of eight dollars or a low value of two dollars, while the fourth and upper dotted weight represents in this instance a value of forty pounds, or a high value of sixteen dollars or a low value of four dollars; but when all four weights are arranged upon the counterpoise-rod K at the same time, as is shown in dotted lines in Fig. 1, they unitedly represent in this instance seventy-five pounds if the price-poise is set at "10," or a money value of thirty dollars at a high rate or price per pound or a money value of seven dollars and fifty cents at a lower rate or price per pound. This construction and arrangement, as will readily be seen, obviates the necessity for removing the weights from the counterpoise-rod and mentally or otherwise adding their respective money and weight or money values together, since the present arrangement shows at a glance the exact value represented by said weights in each of the different money values and weights or money values alone (as may be desired) shown by the columns of characters upon the rod K. It is obvious that it is immaterial whether the figures shown in this instance upon rod K be the same or advance in the same ratio, for it is quite an easy matter in constructing a scale of this character to have the weight-graduations on the bar $C'$ of the price-indicating beam to represent pounds and ounces when the price-poise is set at some number different than "10," in which case the ratio between the weight characters and the money values would be changed proportionately. However, there must exist a certain fixed ratio between the money values and the pound and ounce values, although that ratio may be different from the ones shown in this particular instance. For example, we desire to make a scale in which the pound and ounce graduations on the bar $C'$ of the price-indicating beam can be read when the price-per-pound poise is set at "5" instead of at "10" in the instance shown. In this case instead of showing five pounds on the bar $C'$ ten pounds would be indicated in the same space as five pounds are shown in Fig. 1 by graduations twice as fine, since a load of ten pounds at five cents per pound must be equal to fifty cents and must be counterbalanced when the poise $F^3$ indicates fifty cents in the low-value graduations. Consequently the money values on rod K would remain the same as shown in Fig. 1, but the weights shown upon the rod K would advance in ten-pound values instead of the five-pound increments shown; but if it was not desired to have so fine and crowded weight graduations on bar $C'$ as ten pounds would be in the same space shown in Fig. 1 to be occupied by five pounds the weight-graduations on the bar $C'$ could remain as shown in Fig. 1; but the high and low money values shown thereon must be reduced one-half and yet extend uniformly over the same space they occupy in Fig. 1, so as to show a one-dollar high value and a twenty-five-cent low value occupying the same space as the five-pound-weight graduations upon the said bar $C'$. For example, to illustrate more clearly, as in Fig. 1 shown, the low-value graduations and the weight-graduations on bar $C'$ are at the low rate of ten cents per pound, while the high-value graduations and the weight-indications on said bar $C'$ are at the high rate of forty cents per pound, and when the rate-poise indicates said low rate of ten cents per pound said low-value graduations and said weight-graduations on bar $C'$ and rod K simultaneously indicate both the weight and the money value of loads, and when said rate-poise indicates said high rate of forty cents per pound the high-value graduations and the weight-indications on said bar C' and rod K simultaneously indicate both the weight and the money value of loads, and as said high and low rates are simultaneously indicated by the rate-poise and said value and weight indications on bar C' and rod K are adapted to be simultaneously indicated, respectively, by poise $F^3$ and one or more weights 14 said weight and value indications may be simultaneously read to indicate either the high or low values of articles and their weight. Now if you weigh at ten cents per pound five pounds of that article are worth fifty cents. Likewise if you are weighing a forty-cent article five pounds of it equals two dollars. Consequently in this instance said graduations on bar C' terminate with two dollars, five pounds, and fifty cents, and the corresponding rows of indications on rod K above the first or lowest indication in each row are in multiples or one or more times said terminal sums. However, if you wish said pound and ounce graduations on the bar C' to be read when the price-poise is at a low rate of five or a high rate of twenty you must make your money-graduations one-half as fine as shown. Consequently you would have shown a high money value of one dollar, since five multiplied by twenty equals one dollar, and a low-money value of twenty-five cents, since five multiplied by five equals twenty-five. In this latter instance the low money values on rod K would advance in twenty-five-cent increments, while the high-money-value characters would advance in one-dollar increments.

It will be observed that opposite each row of indications on the bar C' are means or characters for characterizing or distinguishing said several rows of characters. In this instance the words "High value," "At 10¢ per lb.," and "Low value," respectively, characterize or distinguish said high-value indications, said weight indications, and said low-value indications. Similar means are employed for characterizing and distinguishing the corresponding rows of characters upon the rod K for associating the high-value indications on rod K with the high-value indications on bar C', and a different means for associating the low-value indications on said rod with the low-value indications on said bar, and a different means for associating the weight-indications on said rod with the weight-indications on said bar, which three different means in this instance respectively consist of "$ high," "$ low," and "lbs." on said rod K adjacent their corresponding rows of characters thereon.

The casting $C^3$ of the price-indicating beam is provided with an indicating-needle $K^5$, confined in a slot formed between projections L L', (see Fig. 1,) projecting at right angles from and integral with the standard $A^3$.

This slot thus formed confines the movement of and indicates the action of the price-indicating beam.

The base-plate 10 is provided on the rear of its right-hand end, Figs. 1, 2, and 3, with an inclined cross-bar 12, carried in this instance by integral end pieces 13, which end pieces are in this instance also integral with the base-plate 10. This inclined bar 12 is mounted at a slight distance to the rear of base-plate 10 (see Figs. 2 and 3) and is adapted to carry the weights 14, (shown in dotted lines in Fig. 1 and in full lines in Fig. 12,) near the horizontal plane of the rods $a^5$ and K. The base-plate 10 is substantially rectangular, and the substantially circular openings M and M' pass through said plate equal distances from the front edge thereof, the opening M being in this instance near the center of the length of said plate 10 and the opening M' being near the left-hand end thereof. The front edge of plate 10 is provided with a recess at its right-hand end, which extends in this instance near the center of said plate, in which recess the counterpoise-rod $a^5$ swings adjacent the front edge of the right-hand end of said plate 10. Thus the plate 10 is wide at its left-hand end in this instance and narrow at its right-hand end. These weights 14 are slotted to accommodate the rod K. Upon the upper or reading face of each of these weights 14 are a series of indicating characters preferably arranged near each edge of the slot. The characters "14A," Fig. 12, indicate or point to the vertical rows of characters upon rod K, Fig. 1, indicating weight, the characters "14B" indicate or point to the vertical rows of characters on rod K indicating high values in money, while the characters "14C" indicate or point to the vertical rows of characters on rod K, which indicate low values in money. From Fig. 12 it will be seen that the indicating characters "14A," "14B," and "14C" on each side of the slot in the weights 14 are arranged in inverse order with reference to the corresponding series of characters on the opposite side of said slot. This inversion is likewise true of the arrangement of the series of vertical rows of characters upon the rod K (see Fig. 12) and is for the purpose of designating the several independent sets of characters upon said rod K, whether the weights 14 are placed upon the rod K in the position shown in Fig. 12 or whether said weights be placed upon the rod K in the opposite or inverse position. This inversion of the weight and value characters upon opposite sides of the rod K and of the designating characters upon opposite sides of the slot in the weights 14 renders it possible that the value and weight may be read from both sides of the rod K in whatever position the weights 14 are severally placed.

It will be observed that the rate-indicating poise G may be adjustably carried by the tracks E and the rate-pivot G' engaged directly with the notches in the rate or price-per-pound arm of the beam without departure from the spirit and tenor of my invention.

While I have given a detailed and specific description of the means I prefer to employ in this instance in attaining the objects of my invention, I do not desire to be limited thereto in my broader claims, inasmuch as said details may be varied at will by an ordinary or a skilled mechanic without departure from the spirit and scope of my invention.

Having now fully described the construction and the operation of the individual parts of my invention, their operation as a whole will now be described, reference being had to Fig. 1. To change the price per pound, place one thumb and finger upon the integral projection J' of price-poise G and the handle or thumb-piece J. Press part J against the part J'. This brings the forging $i$ forward, unlocks the rate-indicating poise from the notches of bar C, brings the extreme ends of pins $i^3$ and $i^6$ below the lower knife-edge of rate-pivot G', which frees said lower knife-edges of pivot G', and which operation of part J places spring $i^5$ under tension. The poise G is then moved, still pressing the finger-pieces J and J' together, until the indicating-points $g$ or $g'$ of said poise point to the desired rate or price-per-pound indication of bar C. Then release said finger-pieces J and J', when said parts will be automatically returned to the positions shown in Fig. 6 by the action of the spring $i^5$. The poise is thus relocked to the bar C. When weight is applied to the rod $b^4$, the levers B E' swing downward on their respective fulcrums $b'$ $e'$, which movement carries their respective load-pivots $b$ and $e$ downward equal distances, which causes a corresponding downward parallel movement of the tracks E, connected to said pivots, respectively, by rods $A^7$ and $D^2$. This movement of tracks E is imparted to the price-indicating beam by the rate-pivot G' of the rate-indicating poise, which movement is imparted alike at the various positions the rate-indicating poise is capable of being set on said price-indicating beam to vary the leverage of said price-indicating beam proportionate to the rate or price per pound. The steelyard-rod $A^7$, connected at its upper end to load-pivot $a'$ of beam A, imparts the movement of lever B to beam A, and since the weight of the poise G, levers B and E', and the weight-receiving member (not shown, but for convenience may be rod $b^4$) is counterbalanced by the weighted cup on the lower end of counterpoise-rod $a^5$, suspended from counterpoise-pivot $a^2$ of beam A, the tracks E are thus suspended and retained in the operative position shown in Figs. 1 and 4 by reason of their being pivoted to said rod $A^7$, which at all times bears considerable strain, as has been previously stated.

Having now so fully described my invention that others skilled in the art can make, use, and operate the same, what I claim, and desire to secure by Letters Patent, is—

1. The combination of a weighing and a price-indicating beam, the one swinging above the other in the same vertical plane therewith, said beams being in proximity to each other and each provided with indications and a poise, one end of the lower beam extending to an equal or greater length than the load-arm of the upper beam; weight-receiving mechanism; means for connecting the price-indicating beam with said weight-receiving mechanism; a steelyard-rod connecting said upper beam and weight-receiving mechanism; and said steelyard-rod being laterally deflected at an intermediate point to avoid contact with the lower beam, the ends of said rod being in the same vertical plane with said beams; substantially as specified.

2. The combination of a weighing and a price-indicating beam, said weighing-beam swinging vertically above the other in the same vertical plane and in proximity thereto, the price-indicating beam extending to an equal or greater length than the load-arm of the weighing-beam; weight-receiving mechanism; relatively movable means for connecting the price-indicating beam with said weight-receiving mechanism; a steelyard-rod connecting said weighing-beam with said weight-receiving mechanism, said rod being laterally deflected at an intermediate point to avoid contact with the lower or price beam; indicating graduations and poises upon the respective beam; counterpoise weight-receiving rods suspended from the counterpoise-pivots of the respective beams, the ends of said rods being in substantially the same vertical plane with said beams and the ends of said steelyard-rod, and the lower ends of said counterpoise-rods being in proximity to each other; said counterpoise-rod of the upper or weighing beam being laterally deflected at an intermediate point to avoid contact with the lower or price-indicating beam; and a series of counterpoise-weights adapted to be placed upon the lower ends of either or both said counterpoise-rods; substantially as specified.

3. In a price-indicating scale, the combination of a fulcrumed beam, a poise slidable thereon, a support for the article to be weighed, a track carried adjacent to said beam, a series of levers pivotally connected together intermediate their ends, the free ends of two of said levers being pivotally connected to opposite ends of said track or pathway, and means for connecting said beam with said track at different degrees of leverage proportionate to the rate per unit of the article to be weighed, substantially as specified.

4. A price-indicating scale comprising a pivoted beam, a poise slidable thereon, a support for the article to be weighed, a track carried adjacent to said beam, a fulcrumed lever carrying the support for the article to be weighed and one end of said track, a second and separately-fulcrumed lever also connected with the support for the article to be weighed and carrying the other end of said track, and means for connecting said beam with said track at different degrees of leverage proportionate to the rate per unit, substantially as specified.

5. A price-indicating scale comprising a fulcrumed weighing-beam and a fulcrumed price-indicating beam, a poise slidable upon each of said beams, a support for the article to be weighed, a track carried adjacent to said price-indicating beam, a series of levers pivoted together and connected at their respective free ends to said track and to said weighing-beam, and means for connecting said price-indicating beam with said track at different degrees of leverage proportionate to the rate per unit, substantially as specified.

6. A price-indicating scale comprising a fulcrumed weighing-beam and a fulcrumed price-indicating beam, one of said beams being mounted vertically above the other; a poise slidable on each of these beams; a support for the article to be weighed; a track carried in horizontal alinement with the pivots of said price-indicating beam; means for connecting the support for the article to be weighed, with said track and said weighing-beam; and a rate-indicating poise adjustably mounted upon said price-indicating beam and carrying a knife-edged pivot engaging with said track; whereby the adjustment of said rate-indicating poise upon the price-indicating beam varies the rate per unit, since it changes the leverage of the price-indicating beam and varies the effect of weight imparted thereto by said track, substantially as specified.

7. A price-indicating scale comprising a fulcrumed weighing-beam and a fulcrumed price-indicating beam, one of said beams being mounted vertically above the other; a poise slidable on each of these beams; a support for the article to be weighed; a track carried in line with the pivots of said price-indicating beam; a series of levers pivoted together and connected at their respective free ends to said track and said weighing-beam; said levers being mounted vertically below the lower beam and carrying the support for the article to be weighed; and means for connecting said price-indicating beam with said track at different degrees of leverage proportionate to the rate per unit, substantially as specified.

8. A price-indicating scale comprising a fulcrumed weighing-beam mounted vertically above a fulcrumed price-indicating beam; a support for the article to be weighed; a track carried adjacent to said price-indicating beam; a series of levers pivotally connected together and connected at their respective free ends to said track and said weighing-beam, said connections being formed by rods which are bent to one side of and around said price-indicating beam; and means for connecting said price-indicating beam with said track at different degrees of leverage proportionate to the rate per unit, substantially as specified.

9. In a price-indicating scale the combination of a price-indicating beam suitably pivoted; a track carried in line with said pivots and supporting the support for the article to be weighed; a rate-poise mounted upon said price-indicating beam and adapted to be adjusted to positions indicating the different rates indicated upon said beam; a knife-edged rate-pivot carried by said rate-indicating poise and engaging with said track; and means for freeing the knife-edges of said rate-pivot from contact with said track preliminary to and during the movement of said rate-poise in changing the rate per unit, substantially as specified.

10. In a price-indicating scale the combination of a weighing-beam pivoted vertically above a price-indicating beam; a track carried in line with the pivot of said price-indicating beam; a support for the article to be weighed carried by said weighing-beam and said track; a rate-indicating poise mounted upon said price-indicating beam and adapted to be adjusted to positions designating the different rates indicated upon said price-indicating beam; a knife-edged rate-pivot carried by said rate-poise and normally engaging with said track; and means for freeing the knife-edges of said rate-pivot from contact with said track preliminary to and during the movement of said rate-poise in changing the rate per unit, substantially as specified.

11. In a price-indicating scale the combination of a pivoted price-indicating beam; a counterbalanced track mounted adjacent thereto; said track having a substantially vertical movement and carrying the support for the article to be weighed; and an adjustable knife-edged rate-pivot carried by said price-indicating beam and engaging with said track; and a means for freeing the knife-edges of said adjustable rate-pivot from contact with said track preliminary to and during the movement of said adjustable rate-pivot in changing the rate per unit, substantially as specified.

12. In a price-indicating scale the combination of a pivoted weighing-beam A, having load-pivot $a'$, a steelyard-rod $A^7$ suspended from pivot $a'$ and connected at its lower end to pivot $b$ of lever B having fulcrum-pivot $b'$ and load-pivot $b^3$; a pivoted price-indicating beam; a track carried at one end by rod $A^7$, and at its remaining end by rod $D^2$ supported by pivot $e$ of lever $E'$ having fulcrum-pivot $e'$ and load-pivot $e^3$, said lever $E'$ being provided with a counterweighted end; an adjustable connection between the price-indicating beam and said track, the shifting of which connection is adapted to change the rate per unit; and a support for the article to be weighed carried by the load-pivots $b^3$ and $e^3$ of the respective levers B and E', substantially as specified.

13. In a price-indicating scale the combination of a pivoted weighing-beam A, having load-pivot $a'$, supporting a steelyard-rod $A^7$ connected at its lower end to pivot $b$ of lever B, having fulcrum-pivot $b'$ and load-pivot $b^3$; a pivoted price-indicating beam; a track E carried in line with the pivots of the price-indicating beam and supported at one end by rod $A^7$, and at its remaining end by rod $D^2$ carried by pivot $e$ of lever E', having fulcrum-pivot $e'$ and load-pivot $e^3$; said rods $A^7$ and $D^2$ being bent to one side of and around the price-indicating beam; a rate-poise adjustably mounted upon said price-indicating beam; a pivot G' carried by said rate-poise and engaging the respective tracks E; a weight-receiving member supported by the load-pivots $b^3$ and $e^3$ of the respective levers B and E'; whereby the adjustment of the rate-poise and its pivot G' to different positions upon said price-indicating beam varies the rate per unit, substantially as specified.

14. In a price-indicating scale the combination of a pivoted price-indicating beam; a counterbalanced track mounted in a line with the pivots of the price-indicating beam; said track having a substantially vertical movement and carrying the support for the article to be weighed; a rate-poise adjustably mounted upon the computing-beam and carrying said rate-pivot in line with and engaging said track or pathway; said track being composed of upper and lower parallel faces extending a distance slightly greater than the limit of movement of said rate-poise, and said upper and lower faces of this track being adapted to alternately engage the respective upper and lower knife edges of pivot G' in the operation of indicating the price of greater or lesser weights, substantially as specified.

15. In a price-indicating scale the combination of a pivoted price-indicating beam; a counterbalanced track mounted in line with the pivots of the price-indicating beam; said track having a substantially vertical movement and carrying the support for the article to be weighed; a rate-poise slidingly mounted upon the price-indicating beam and carrying a rate-pivot in line with and engaging said track; said track or pathway being composed of upper and lower parallel faces extending a distance slightly greater than the limit of movement of said rate-poise; and means for freeing the lower knife-edge of pivot G' from contact with the track preliminary to and during the movement of said rate-poise in changing the rate per unit, substantially as specified.

16. In a price-indicating scale the combination of a pivoted price-indicating beam having a central slotted portion, in which is mounted a counterbalanced track extending in line with the pivots of the price-indicating beam; said track having a substantially vertical movement and carrying a support for the article to be weighed; a rate-poise adjustably mounted upon the price-indicating beam and carrying a rate-pivot in line with and engaging said track; said track or pathway being composed of upper and lower parallel faces extending of a distance slightly greater than the limit of movement of said price-poise, substantially as specified.

17. In a price-indicating scale the combination of a pivoted price-indicating beam; a counterbalanced track mounted in line with the pivots of the price-indicating beam; said track having a substantially vertical movement and carrying the support for the article to be weighed; a rate-poise mounted upon the price-indicating beam and carrying a rate-pivot in line with and engaging said track; a series of notches on said price-indicating beam; a series of V-shaped projections carried by said rate-poise and adapted to engage said notches and lock said poise to said beam; and means coöperating with said locking projections for freeing the lower knife-edge of said rate-pivot from contact with the track only when said rate-poise is unlocked, substantially as specified.

18. In a price-indicating scale the combination of a pivoted price-indicating beam; a counterbalanced track or pathway mounted in line with the pivots of the price-indicating beam; said track or pathway having a substantially vertical movement and carrying the support for the article to be weighed; a rate-indicating poise mounted upon the price-indicating beam and carrying a rate-pivot in line with and engaging said track or pathway; a series of notches on said price-indicating beam; a series of V-shaped projections $i^4$, carried by forging $i$ mounted upon shaft I having spiral threads engaged by projections of said forging $i$; arms $i^2$ carried by forging $i$ and supporting-pins $i^3$ projecting through openings in face-plate H' of the poise; a pin $i^6$ secured to the rear end of shaft I; a finger-piece J secured to the front end of said shaft; a spring $i^5$ having its respective ends secured to parts J and H'; and a finger-piece J' rigid upon part H' and the poise, whereby when said finger-pieces J and J' are pressed together the rate-indicating poise is unlocked from the price-indicating beam and the lower knife-edge of said rate-pivot is freed from contact with the track or pathway, substantially as specified.

19. In a price-indicating scale the combination of a pivoted price-indicating beam; a counterbalanced track mounted in line with the pivots of the price-indicating beam; said track having a substantially vertical movement and carrying the support for the article to be weighed; the respective ends of said track or pathway being pivoted to its supporting-rods by pivots provided with a series of knife-edges projecting in different directions and engaging in the octagonal-shaped openings in said supporting-rods; and a rate-poise mounted upon the price-indicating beam and carrying a rate-pivot in line with and engaging said track, substantially as specified.

20. In a computing-scale the combination of a pivoted computing-beam; a counterbalanced track mounted in line with the pivots of the computing-beam; said track having a substantially vertical movement and carrying the support for the article to be weighed; a price-poise mounted upon the computing-beam and carrying pivot $G'$ in line with and engaging said track; said pivot $G'$ being formed with knife-edged friction-points $G^2$, $G^3$, $G^4$ and $G^5$, adapted to alternately engage the edges of said track to form knife-edged pivots to resist lateral movements of either said poise or said track, substantially as specified.

21. In a price-indicating scale the combination of the weighing-beam $A$ supported in yoke $a^3$ secured to projection $A'$ of frame-piece $A^2$ secured to standards $A^3$ and $A^4$, having integral feet $A^5$ secured to base-plate 10; an indicating-needle $a^4$ on free end of beam $A^4$ and moving in a slot formed by integral projections $A^6$ of standard $A^3$; a price-indicating beam vertically below said weighing-beam and fulcrumed upon a U-shaped standard $C^4$ rigidly secured to base-plate 10; an indicating-needle $K^5$ on the end of said price-indicating beam and moving in a slot formed by integral projections $L$ and $L'$ of standard $A^3$; counterpoise-rods suspended from the counterpoise-pivots $a^2$ and $c^3$ of the weighing and price-indicating beams respectively; disks upon the lower ends of said counterpoise-rods, said disks being adjacent and in substantially the same horizontal plane; counterpoise-weights adapted to be placed upon said counterpoise-rods; a frame for retaining said counterpoise-weights when not required on said counterpoise-rods, composed of a bar 12, having end pieces 13, rigid with said base-plate 10; and means for connecting the weight-receiving member with the weighing and price-indicating beams, substantially as specified.

22. In a scale the combination of the plate 10 having the openings $M$ and $M'$ near one edge of the widest end of said plate, an inclined bar 12 having end pieces rigid with the plate 10, said end pieces projecting from the opposite edge of plate 10 at its narrow end, the narrow end of said plate being formed by a recess in one end of the edge adjacent said openings $M$ and $M'$; substantially as specified.

23. In a price-scale, the combination of a base; a price-indicating beam and a weight-indicating beam fulcrumed upon projections of said base, one beam being above the other and in substantially the same vertical plane; a horizontal vertically-movable part adjacent the price-beam, said horizontal part being invariably connected to said weighing-beam; a variable rate-per-unit connection between said price-beam and horizontal part; vertical rods connected to said horizontal part at opposite ends, and pivotally connected to the load-receiver at a point vertically below the said beams; said rods being laterally deflected a portion of their length to avoid contact with the lower beam; said rods passing each through an opening vertically below said beams and near one edge and toward one end of said base to connect with said load-receiver at their lower ends; a recess in said edge of said base at its opposite end; and counterpoise-rods suspended from said beams and swinging adjacent the edge of said recess, substantially as specified.

24. In a scale, the combination of a beam provided with notches whose sharp points taper upward from one side of the beam to the other; a poise moving on said beam; a series of V-shaped projections mounted in said poise to move laterally at an angle into and out of engagement with the notches on said beam; an operating-handle for moving said V-shaped projections; and a spring operating to keep said V-shaped projections locked in the notches of said beam, substantially as specified.

25. In a scale, the combination of a beam provided with V-shaped notches cut on an angle; a poise sliding on said beam, said poise being formed of a shell $H$ and an attached face-plate $H'$; a series of V-shaped projections mounted in said poise to move laterally at an angle into and out of engagement with the notches in said beam; an operating-handle for withdrawing the V-shaped projections from engagement with the notches in said beam; a spring operating to return and hold said V-shaped projections in engagement with the notches in said beam; said shell $H$ being provided with a slot $h'$ slightly wider than said beam whereby the poise when unlocked from said beam will have but a limited vertical movement thereon, which insures the said V-shaped projection being properly reseated in the notches of said beam, substantially as specified.

26. In a scale, the combination of a beam provided with V-shaped notches cut at an angle; a poise on said beam, composed of a shell $H$ and an attached face-plate $H'$; a shaft $I$ mounted at an angle in parts $H$ and $H'$ where said shaft is provided with shouldered bearings; spiral screw-threads $i''$ in shaft $I$; a forging $i$ mounted on said shaft $I$ and having projections which engage in said spiral threads $i'$; a series of V-shaped projections $i^4$ on said part $i''$ and adapted to move at an angle into and out of engagement with the notches on said beam by the rotation of said shaft $I$; an operating-handle $J$ on the outer end of shaft $I$; a spring $i^5$ secured at one end to part $J$ and at its other end to part $H'$ for reëngaging the V-shaped projections $i^4$ with their notches in said beam and a finger-piece $J'$ integral with the part H′, substantially as and for the purpose specified.

27. The combination of a pivoted price-indicating beam, a track carried in horizontal alinement with the pivots of said beam; an adjustable knife-edged pivot carried by one of said parts and engaging with the other; and a support for the article whose price is to be indicated connected to said track, substantially as specified.

28. The combination of a pivoted price-indicating beam, having a central slotted portion in which is independently mounted a track in horizontal alinement with the pivots of said beam; a knife-edged pivot adjustably carried by one of said parts and engaging with the other; and a support for the load connected to said track, substantially as specified.

29. In a price-indicating scale, the combination with the weighing and the price-indicating beams, a pivoted lever B connecting the weighing-beam with a weight-receiving member, a lever E′ connected to said lever B, a track E carried by said levers B and E′, and a variable connection between said track E and the price-indicating beam, the weight of said connection being carried by the track E, substantially as specified.

30. In a price-indicating scale, the combination of a weight-receiving member connected to a counterbalanced track mounted adjacent to the price-indicating beam, said track being adapted to move vertically; a series of notches upon the price-indicating beam representing different rates per unit; a horizontally-movable connection between said price-indicating beam and said tracks; locking projections carried by said connection and movable bodily to one side of the beam, said locking projections being adapted to engage with the notches in said beam to lock said connection at the different rates per unit, the abutting lateral edges of said notches and projections being beveled, substantially as specified.

31. In a price-scale, the combination of a price-indicating beam; a vertically-movable horizontal bar; a longitudinally-movable connection between said bar and price-beam; a series of separately-fulcrumed levers pivotally connected to opposite ends of said bar; and a load-receiver and a tare-beam pivotally connected to said levers; substantially as specified.

32. In a price-scale, the combination of a price-indicating beam, a vertically-movable bar in engagement therewith, a series of separately-fulcrumed levers supporting said bar, and a load-receiver, pivotally connected to and independent of said levers; substantially as specified.

33. In a price-indicating scale, the combination of a weight-receiving member connected to a vertically-movable horizontal part, a price-indicating beam fulcrumed parallel to said horizontal part, a series of substantially V-shaped notches on the upper edge of a member of said price-beam, a rate-poise longitudinally movable on said member of said beam and having a series of non-pivotally mounted substantially V-shaped projections fitting into said notches, a pivotal connection between said rate-poise and said horizontal part, the horizontal part drawing the rate-poise downward by said pivotal connection and the projections of said poise transmitting said draft to the notches on said member of said beam during the operation of indicating the price of a load, and means for withdrawing said projections of said poise from engagement with said notches of said price-beam preliminary to and for holding them out of engagement therewith during the movement of said poise to change the rate per unit, substantially as specified.

34. In a price-indicating scale, the combination of a weight-receiving member connected to a vertically-movable horizontal part, a price-indicating beam fulcrumed parallel to said horizontal part, a series of substantially V-shaped notches on the upper edge of a member of said price-beam, a rate-poise longitudinally movable on said member of said beam and having a series of substantially V-shaped projections fitting into said notches, a pivotal connection between said rate-poise and said horizontal part, the horizontal part drawing the rate-poise downward by said pivotal connection and the projections of said poise transmitting said draft to the notches on said member of said beam during the operation of indicating the price of a load, means for withdrawing said projections of said poise from engagement with said notches of said price-beam, and means for non-pivotally connecting said poise and horizontal part, both of said means operating substantially in unison to non-pivotally support said poise upon said horizontal part and keep said projections of said poise out of engagement with said notches on said price-beam during the movement of said poise in changing the rate per unit, substantially as specified.

35. In a price-indicating scale, the combination of a weight-receiving member connected to a vertically-movable horizontal part, a price-indicating beam fulcrumed parallel to said horizontal part, a series of substantially V-shaped notches on the upper edge of a member of said price-beam, a rate-poise longitudinally movable on said member of said beam and having a series of substantially V-shaped projections fitting into said notches, a pivotal connection between said rate-poise and said horizontal part, the horizontal part drawing the rate-poise downward by said pivotal connection and the projections of said poise transmitting said draft to the notches on said member of said beam during the operation of indicating the price of a load, and means including a portion intermediate said poise and said horizontal part for withdrawing said projections of said poise from engagement with said notches of said price-beam and non-pivotally connecting said poise and horizontal part, and for maintaining said position of said projections and said non-pivotal connection during the movement of said poise in changing the rate per unit, substantially as specified.

36. In a price-indicating scale, the combination of a weight-receiving member connected to a vertically-movable horizontal part, a price-indicating beam fulcrumed parallel to said horizontal part, a series of substantially V-shaped notches on the upper edge of a member of said price-beam, a rate-poise longitudinally movable on said member of said beam and having a series of substantially V-shaped projections fitting into said notches, a pivotal connection between said rate-poise and said horizontal part, the horizontal part drawing the rate-poise downward by said pivotal connection and the projections of said poise transmitting said draft to the notches on said member of said beam during the operation of indicating the price of a load, and means including portions on opposite sides of the pivotal connection of said poise, said portions being longitudinally movable with said poise, for withdrawing said projections of said poise from engagement with said notches of said price-beam and non-pivotally connecting said poise and horizontal part, and for maintaining said position of said projections and said non-pivotal connection during the movement of said poise in changing the rate per unit, substantially as specified.

37. In a price-indicating scale, the combination of a weight-receiving member connected to a vertically-movable horizontal part, a price-indicating beam fulcrumed parallel to said horizontal part, a series of substantially V-shaped notches on the upper edge of a member of said price-beam, a rate-poise longitudinally movable on said member of said beam and having a series of substantially V-shaped projections fitting into said notches, a pivotal connection between said rate-poise and said horizontal part, the horizontal part drawing the rate-poise downward by said pivotal connection and the projections of said poise transmitting said draft to the notches on said member of said beam during the operation of indicating the price of a load, and manually-operated means independent of said pivotal connection and movable with said poise for breaking the pivotal connection between and non-pivotally connecting said poise and horizontal part, and for holding said projections of said poise out of engagement with said notches on said price-beam during the movement of said poise in changing the rate per unit, substantially as specified.

38. In a price-indicating scale, the combination of a weight-receiving member connected to a vertically-movable horizontal part, a price-indicating beam fulcrumed parallel to said horizontal part, a series of substantially V-shaped notches on the upper edge of a member of said price-beam, a rate-poise longitudinally movable on said member of said beam and having a series of substantially V-shaped projections fitting into said notches, a pivotal connection between said rate-poise and said horizontal part, the horizontal part drawing the rate-poise downward by said pivotal connection and the projections of said poise transmitting said draft to the notches on said member of said beam during the operation of indicating the price of a load, portions movable with said poise and on opposite sides of its pivotal connection with said horizontal part, and means for withdrawing said projections of said poise from engagement with said notches on said beam and for substantially simultaneously operating said portions to non-pivotally connect and slidably support said poise upon said horizontal part during the movement of said poise in changing the rate per unit, substantially as specified.

39. The combination of a pivot $D^3$ supported at opposite ends in one member, the portion intermediate the ends of said pivot being of a reduced diameter and provided with a series of knife-edges projecting in different directions, beveled surfaces extending from the opposite ends of said portion of reduced diameter to the end portions of said pivot and forming antifriction-points $D^9$, and a separate member having a bearing-seat therein formed of a series of V-shaped seats to loosely receive the said different knife-edges formed on said reduced portion of said pivot, the external edges of said bearing-seats being adapted to laterally contact with one or more of said antifriction-points $D^9$ to eliminate the friction of lateral strains, substantially as specified.

40. In a price-indicating scale, the combination of a price-indicating beam, a vertically-movable horizontal part parallel therewith, a horizontally-movable rate connection between said horizontal part and said beam, and a separate non-horizontally-movable connection between said horizontal part and said beam, substantially as specified.

41. In a price-indicating scale, the combination of a price-indicating beam, a vertically-movable horizontal part parallel therewith, a horizontally-movable rate connection between said horizontal part and said beam, a projection connected to said horizontal part, and a slot in said beam in which slot said projection is mounted to move and at times to form a connection between said part and said beam, substantially as specified.

42. In a weighing and price-indicating scale the combination of a weight-indicating beam, a price-indicating beam, a load-receiver, a vertically-movable horizontal part parallel with said price-beam and connected with said weighing-beam and said load-receiver, a horizontally-movable rate connection between said horizontal part and said price-beam, and a separate non-horizontally-movable connection between said price-beam and said load-receiver, substantially as specified.

43. In a weighing and price-indicating scale the combination of a weight-indicating beam, a price-indicating beam, a load-receiver, a vertically-movable horizontal part parallel with said price-beam and connected with said weighing-beam and said load-receiver, a horizontally-movable rate connection between said horizontal part and said price-beam, a projection connected to said load-receiver, and a slot in said price-beam in which slot said projection is mounted to move and at times to form a connection between said load-receiver and said price-beam, substantially as specified.

IRA C. KOEHNE.

Witnesses:
L. C. LEOTY,
GEO. GREENWAY,
K. E. PEIFFER.